US010097532B2

(12) United States Patent
Kawabata et al.

(10) Patent No.: US 10,097,532 B2
(45) Date of Patent: *Oct. 9, 2018

(54) SESSION MANAGEMENT TECHNIQUE

(71) Applicant: International Business Machines Corporation, Armonk, NY (US)

(72) Inventors: Kuniaki Kawabata, Fujisawa (JP); Kohsuke Okamoto, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 370 days.

This patent is subject to a terminal disclaimer.

(21) Appl. No.: 14/583,782

(22) Filed: Dec. 29, 2014

(65) Prior Publication Data

US 2015/0121502 A1    Apr. 30, 2015

Related U.S. Application Data

(63) Continuation of application No. 13/461,648, filed on May 1, 2012, now Pat. No. 9,055,054, which is a
(Continued)

(30) Foreign Application Priority Data

Dec. 11, 2007  (JP) ................................ 2007-292974

(51) Int. Cl.
*H04L 29/08*    (2006.01)
*H04L 29/06*    (2006.01)
(Continued)

(52) U.S. Cl.
CPC ........ *H04L 63/0815* (2013.01); *H04L 63/168* (2013.01); *H04L 67/14* (2013.01);
(Continued)

(58) Field of Classification Search
CPC . H04L 67/14; H04L 67/148; H04L 29/12754; H04L 65/1093; H04L 12/2859;
(Continued)

(56) References Cited

U.S. PATENT DOCUMENTS 6,587,880 B1    7/2003  Saigo et al.
6,807,529 B2    10/2004 Johnson et al.
(Continued)

FOREIGN PATENT DOCUMENTS

JP    2005011098      1/2005
JP    2006031064 A    2/2006

OTHER PUBLICATIONS

Cardellini V, Casalicchio E, Colajanni M, Yu PS. The state of the art in locally distributed Web-server systems. ACM Computing Surveys (CSUR). Jun. 1, 2002;34(2):263-311. (Year: 2002).*

*Primary Examiner* — Ranodhi Serrao
*Assistant Examiner* — James N Fiorillo
(74) *Attorney, Agent, or Firm* — Roy W. Truelson

(57) ABSTRACT

A system for managing sessions between a client and multiple servers includes: a receiver for receiving, as a proxy for each of the servers, a request from the client to any of the servers; a determination unit for determining, upon receipt of the request from the client to any of the servers, whether sessions established between the client and the multiple servers are maintained; a disconnection unit for disconnecting, on condition that a session between the client and any of the multiple servers is already disconnected, the sessions established between the client and the servers different from the disconnected server; and a forward unit for forwarding, on condition that the sessions established between the client and all of the multiple servers are maintained, the received request to the destination server for the request.

6 Claims, 12 Drawing Sheets

Related U.S. Application Data continuation of application No. 12/266,223, filed on Nov. 6, 2008, now Pat. No. 8,195,808.

(51) Int. Cl.
 *G06F 17/30* (2006.01)
 *G06F 21/10* (2013.01)

(52) U.S. Cl.
 CPC .......... H04L 67/146 (2013.01); H04L 67/148 (2013.01); H04L 67/28 (2013.01); *G06F 17/30053* (2013.01); *G06F 21/10* (2013.01); *H04L 67/02* (2013.01)

(58) Field of Classification Search
 CPC ..... H04L 65/4007; H04L 67/22; H04L 67/04; H04L 67/28; H04L 67/141; H04L 63/0209; H04L 63/0281; H04L 63/0245; H04L 63/0815; H04W 36/0011; H04W 76/02; G06F 17/30581; G06F 11/1658; G06F 21/31; H04M 3/567
 USPC .................. 709/227, 228; 726/1, 2, 8, 12, 27
 See application file for complete search history.

(56) References Cited

U.S. PATENT DOCUMENTS

| | | | |
|---|---|---|---|
| 6,907,450 B1 | 6/2005 | Lautenbacher | |
| 7,219,154 B2 | 5/2007 | Blakely | |
| 7,793,342 B1* | 9/2010 | Ebrahimi | H04L 63/0281 713/166 |
| 7,809,609 B2 | 10/2010 | Hikida | |
| 8,037,538 B2* | 10/2011 | Baba | H04L 9/3271 709/229 |
| 8,996,857 B1* | 3/2015 | Akella | H04L 63/0815 713/153 |
| 2002/0091808 A1* | 7/2002 | Fukasawa et al. | 709/223 |
| 2004/0205068 A1 | 10/2004 | Iyer et al. | |
| 2005/0251855 A1* | 11/2005 | Brandstatter | H04L 63/0209 726/12 |
| 2006/0026286 A1 | 2/2006 | Lei et al. | |
| 2006/0026290 A1* | 2/2006 | Pulito | H04L 67/04 709/227 |
| 2006/0070131 A1* | 3/2006 | Braddy | G06F 21/31 726/27 |
| 2006/0136990 A1* | 6/2006 | Hinton | H04L 63/0815 726/2 |
| 2007/0067638 A1* | 3/2007 | Haibl et al. | 713/182 |
| 2007/0124345 A1* | 5/2007 | Heinz | G06F 11/1464 |
| 2007/0220155 A1* | 9/2007 | Nalla | H04L 67/141 709/227 |
| 2008/0034092 A1 | 2/2008 | Kikuchi et al. | |
| 2008/0163337 A1* | 7/2008 | Tuliani | H04L 63/0245 726/2 |
| 2009/0249440 A1* | 10/2009 | Platt | H04L 63/0815 726/1 |
| 2010/0146061 A1* | 6/2010 | Mattsson et al. | 709/206 |

\* cited by examiner

| CLIENT-SIDE URL | SERVER-SIDE URL | |
|---|---|---|
| http://www.△△.com/jct1/index.html | http://www.△△A.com/index.html | ←-- SERVER APPARATUS 200A |
| http://www.△△.com/jct2/index.html | http://www.△△B.com/index.html | ←---- SERVER APPARATUS 200B |
| http://www.△△.com/jct3/index.html | http://www.△△C.com/index.html | ←-- SERVER APPARATUS 200C |

500A

| CLIENT-SIDE ID | SERVER-SIDE ID | SERVER-SIDE URL |
|---|---|---|
| 35352 | 51552 | http://www.△△A.com/index.html |
| 35352 | 48232 | http://www.△△B.com/index.html |
| 35352 | 56521 | http://www.△△C.com/index.html |

| SERVER-SIDE URL | CONFIRMATION REQUEST | EXPECTED RESPONSE |
|---|---|---|
| http://www.△△A.com/index.html | POST/ ··· | HTTP/1.1 200 OK ··· |
| http://www.△△B.com/index.html | GET/ ··· | HTTP/1.1 200 OK ··· |
| http://www.△△C.com/index.html | POST/ ··· | HTTP/1.1 200 OK ··· |

500C

| SERVER-SIDE URL | DISCONNECTION REQUEST |
|---|---|
| http://www.△△A.com/index.html | POST/ ··· |
| http://www.△△B.com/index.html | GET/ ··· |
| http://www.△△C.com/index.html | POST/ ··· |

| CLIENT-SIDE URL | SERVER-SIDE URL | TIME-OUT PERIOD |
|---|---|---|
| http://www.△△.com/jct1/index.html | http://www.△△A.com/index.html | 5 MINUTES |
| http://www.△△.com/jct2/index.html | http://www.△△B.com/index.html | 7 MINUTES |
| http://www.△△.com/jct3/index.html | http://www.△△C.com/index.html | 10 MINUTES |

500A

SERVER APPARATUS 200A
SERVER APPARATUS 200B
SERVER APPARATUS 200C

FIG. 10

SESSION MANAGEMENT TECHNIQUE

CROSS REFERENCE TO RELATED APPLICATIONS

This is a continuation of U.S. patent application Ser. No. 13/461,648, filed May 1, 2012, entitled "Session Management Technique", which is a continuation of U.S. Pat. No. 266,223, filed Nov. 6, 2008, entitled "Session Management Technique", now issued as U.S. Pat. No. 8,195,808, both of which applications are herein incorporated by reference. This application claims priority under 35 U.S.C. § 120 of U.S. patent application Ser. No. 13/461,648, filed May 1, 2012, and U.S. patent application Ser. No. 12/266,223, filed Nov. 6, 2008.

BACKGROUND OF THE INVENTION

The present invention relates to a technique for managing sessions. The present invention more specifically relates to a technique for managing a session established between a client apparatus and each of a plurality of server apparatuses.

In recent years, a Single Sign-On (SSO) authentication system implemented by a reverse proxy server has been used. In the SSO authentication system, a reverse proxy server acting as a proxy for a plurality of server apparatuses collectively processes authentication requests received from a client apparatus. When the authentication is successful, a session between the client apparatus and each of the plurality of servers are established. As described, in the SSO authentication system, the user can access every one of the plurality of server apparatuses by performing a login operation only once (refer to paragraph 0219 of Japanese Patent Application Publication No. 2005-11098, for example).

In the SSO authentication system, it is preferable that the authentication statuses respectively of the plurality of server apparatuses should be in synchronization. In a system including a plurality of server apparatuses operating in a coordinated manner, for example, an unexpected error may occur when a session is disconnected in a server apparatus, that is, when a session is disconnected only in a part of the system. However, when a system is to be built taking into consideration various combinations of authentication statuses are, the amount of work and costs associated with the development of the system adversely increases.

In the meantime, an existing server apparatus, itself, is provided with a function to disconnect a session, such as time-out detection and log-out detection, in many cases. Specifically, the user himself or herself disconnects a session with each server apparatus by logging out from the server, or each server apparatus can disconnect a session by use of the time-out detection function. For this reason, when such server apparatuses are used without any modification in the SSO authentication system, the inconsistency of authentication statuses may occur.

For this reason, the existing server apparatus cannot be used as it is for the implementation of an SSO authentication system, so that a different server dedicated for the system needs to be developed, or some functions of the existing server apparatus needs to be modified.

In this regard, an object of the present invention is to provide a system, a method and a program that are capable of solving the aforementioned problem. The object is achieved by combining the features recited in the independent claims of the scope of claims. In addition, the dependent claims define more advantageous specific examples of the present invention.

SUMMARY OF THE INVENTION

In order to solve the aforementioned problem, a first aspect of the present invention provides a system for managing sessions between a client apparatus and a plurality of server apparatuses, the system including: a receiver, a determination unit, a disconnection unit and a forward unit. The receiver receives, as a proxy for each of the plurality of server apparatuses, a request from the client apparatus to each of the plurality of server apparatuses. The determination unit determines, upon receipt of the request from the client apparatus to any of the plurality of sever apparatuses, whether the session established between the client apparatus and each of the plurality of server apparatuses is maintained. The disconnection unit disconnects, on condition that a session between the client apparatus and at least any one of the plurality of server apparatuses is already disconnected, the session established between the client apparatus and each of the server apparatuses different from the at least any one of the plurality of server apparatuses. The forward unit forwards, on condition that the sessions established between the client apparatus and all of the plurality of server apparatuses are maintained, the received request to the destination server apparatus of the request. Furthermore, the present invention provides a program causing a computer to function as the system and a method for managing sessions by the system.

It should be noted that the aforementioned summary of the present invention does not list all of the essential aspects of the present invention. A sub-combination group of these aspects can also be the invention.

BRIEF DESCRIPTION OF THE DRAWINGS

For a more complete understanding of the present invention and the advantage thereof, reference is now made to the following description taken in conjunction with the accompanying drawings.

FIG. 6 shows examples of URL correspondence data 500A and session ID correspondence data 500B, which are stored in the storage unit 304.

FIG. 7 shows examples of confirmation data 500C and disconnection data 500D, which are stored in the storage unit 304.

FIG. 10 shows an example of URL correspondence data 500A according to the variation of the present embodiment.

DETAILED DESCRIPTION OF THE PREFERRED EMBODIMENT

Hereinafter, the present invention will be described by using a preferred mode for carrying out the present invention (referred to as an embodiment, below). The following embodiment, however, does not limit the present invention recited in the scope of claims, and all combinations of the features described in the embodiment are not necessarily essential for solving means of the present invention.

Figure 1:
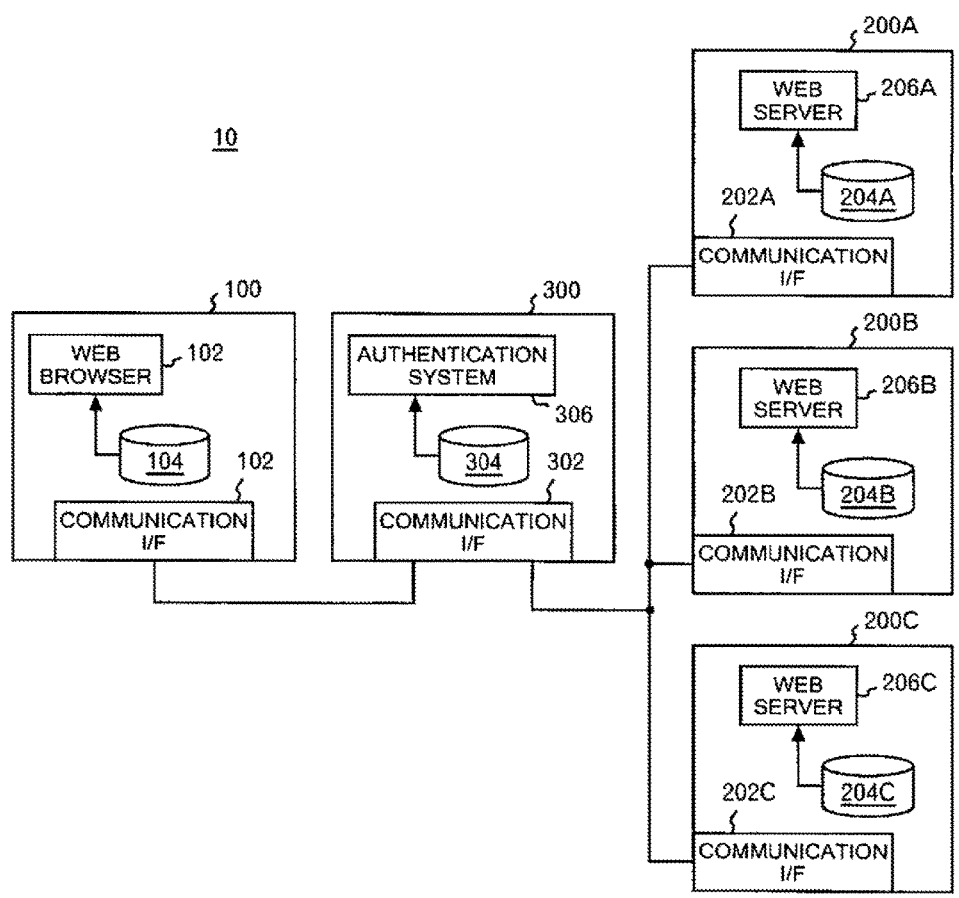
FIG. 1 shows an entire configuration of a communication network 10 according to the present embodiment.

FIG. 1 shows an entire configuration of a communication network 10 according to the present embodiment. The communication network 10 includes a client apparatus 100, a plurality of server apparatuses 200 (server apparatuses 200A to 200C, for example) and a reverse proxy server system 300. The client apparatus 100 includes, as the basic hardware, a communication interface 102 such as a network interface card, and a storage unit 104 such as a hard disk drive. Then, the client apparatus 100 functions as a web browser 106 by executing through a CPU a program read from the storage unit 104.

Likewise, each of the server apparatuses 200A to 200C includes, as the basic hardware, a communication interface 202 such as a network interface card and a storage unit 204 such as a hard disk drive. The components described above are referred to as communication interfaces 202A to 202C and storage units 204A to 204C. Then, the server apparatuses 200A to 200C function as web servers 206A to 206C by executing programs through CPUs read from the storage units 204A to 204C, respectively.

Likewise, the reverse proxy server 300 includes, as the basic hardware, a communication interface 302 such as a network interface card and a storage unit 304 such as a hard disk drive. Then, the reverse proxy server system 300 functions as an authentication system 306 by executing through a CPU a program read from the storage unit 304. The authentication system 306 performs various kinds of control in order that the user of the client apparatus 100 can utilize each of the server apparatuses 200A to 200C by logging in once. Specifically, the various kinds of control are as follows, for example.

First, the authentication system 306 authenticates the user in accordance with a request from the client apparatus 100. The authentication system 306 establishes a session between the client apparatus 100 and the reverse proxy server system 300 when the authentication is successful. At this time, the reverse proxy server system 300 acts as a proxy for the client apparatus 100 and establishes a session between the client apparatus 100 and each of the server apparatuses 200A to 200C.

The term, "session," used herein refers to one unit of access made by a user to a web site. The session refers to a series of processing to be performed from the time when the user logs in to the web site with the user name until the user logs out from the web site (transmittance and receipt of requests or responses, for example). In a case where there is no access for a predetermined time period (de facto standard is 30 minutes), the session ends due to the time-out detection even when no explicit logout is present. Moreover, the establishment of a session refers to the allocation of a storage area for session management in the server apparatus 200 or the reverse proxy server system 300 in order to allow the aforementioned management of the session.

After the establishment of a session, the reverse proxy server system 300 converts the destination URL of a request being received from the client apparatus 100 with addressed to the reverse proxy server system 300 into the URL of a given server apparatus among the server apparatuses 200A to 200C and thereby selectively forwards the request to one of the server apparatuses 200A to 200C. In addition, the reverse proxy server system 300 performs conversion of a session ID and appropriately manages the session.

In the communication network 10 described above, unless the authentication statuses for the same user in each server apparatuses 200A to 200C are in synchronization, it is difficult to properly operate the server apparatuses 200A to 200C since there is a case where unexpected errors occur in the server apparatuses 200A to 200C. With respect to this situation, an object of the present embodiment is by reverse proxy server system 300 according to appropriately operate the server apparatuses 200A to 200C by appropriately synchronizing the authentication statuses. The descriptions thereof will be specifically given below.

Figure 2:
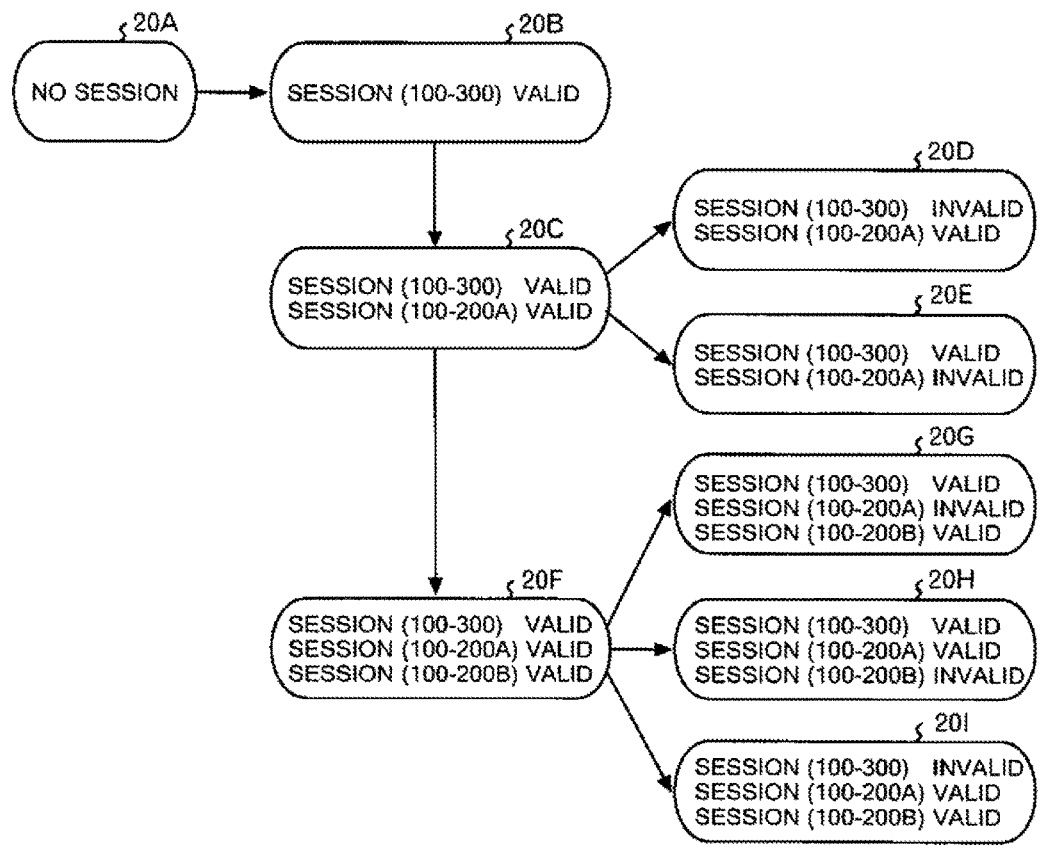
FIG. 2 shows an example of a transition of an authentication state.

FIG. 2 shows an example of transition of an authentication status. For the purpose of simplifying the descriptions, suppose that the proxy server system 300 acts as a proxy for and performs the authentications for the server apparatuses 200A to 200B and is not involved with the authentication for the server apparatus 200C in FIG. 2. In the initial status, that is, for example, the status in which the entire system is reset, no session is established (20A). The reverse proxy server system 300 establishes a session between the client apparatus 100 and the reverse proxy server system 300 in accordance with the request received from the client apparatus 100 (20B).

If the logging in is successful in the state in which this session is established, sessions between the client apparatus 100 and the server apparatus 200A and between the client apparatus 100 and the server apparatus 200B are sequentially established (20C and 20F). Suppose that the authentication statuses change in an unsynchronized manner, it is possible to selectively disconnect only one of the sessions. In the state shown in 20C, for example, only the session between the client apparatus 100 and the reverse proxy server system 300 may be disconnected (20D).

Furthermore, in the state shown in 20C, only the session between the client apparatus 100 and the server apparatus 200A may be disconnected, for example (20E). Moreover, in the state shown in 20F, only the session between the client apparatus 100 and the server apparatus 200A may be disconnected (20G), or only the session between the client apparatus 100 and the server apparatus 200B may be disconnected (20H), or only the session between the client apparatus 100 and the reverse proxy server system 300 may be disconnected (20I).

As described above, if the authentication statuses in the respective server apparatuses 200A to 200B can be different, the number of combinations of the authentication statuses to be assumed becomes large. In a case where the server apparatuses 200A and 200B operate in a coordinated manner, for example, an error handling function supporting all of such combinations has to be prepared, so that there is a concern that the development costs and work increase.

Figure 3:
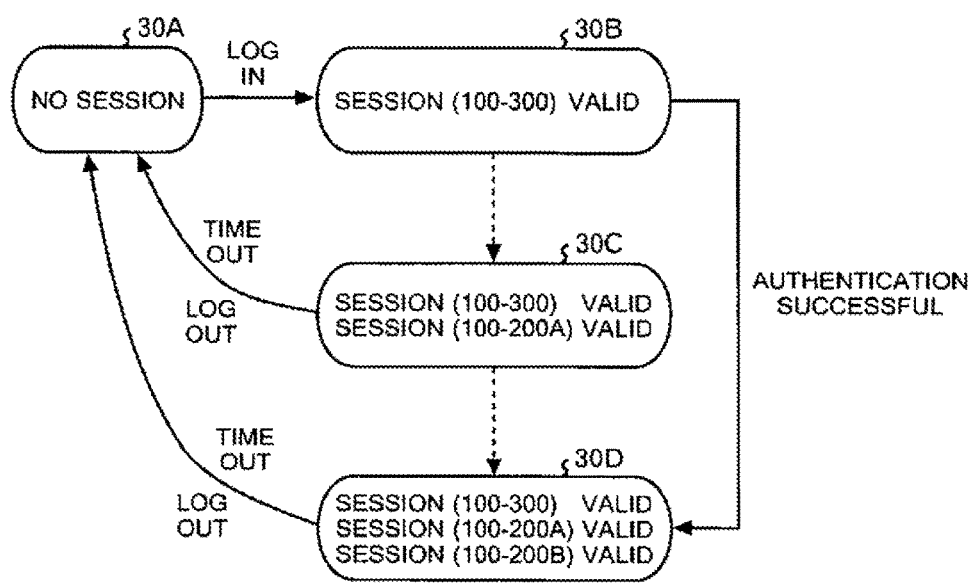
FIG. 3 shows an example of a transition of an authentication state according to the present embodiment.

FIG. 3 shows an example of transition of an authentication status according to the present embodiment. For the purpose of simplifying the descriptions, suppose that the proxy server system 300 acts as a proxy for and performs the authentications for the server apparatuses 200A to 200B and is not involved with the authentication for the server apparatus 200C in FIG. 3. In the initial status, that is, the status in which the entire system is reset, for example, no session is established (30A). The reverse proxy server system 300 establishes a session between the client apparatus 100 and the reverse proxy server system 300 in accordance with the request received from the client apparatus 100 (30B).

If the logging in is successful in the state in which this session is established, the sessions between the client apparatus 100 and the server apparatus 200B as well as between the client apparatus 100 and the server apparatus 200A are sequentially established (30C and 30D). In a case where time-out is detected by one of the server apparatuses 200A and 200B, or where the user logs out from one of the server apparatuses 200A and 200B, any session that has been already established is disconnected, and the authentication status returns to the status 30A. If the authentication statuses are controlled in the manner described above, the number of combinations of the statuses to be taken into consideration in the management of the server apparatuses 200A and 200B can be reduced.

Figure 4:
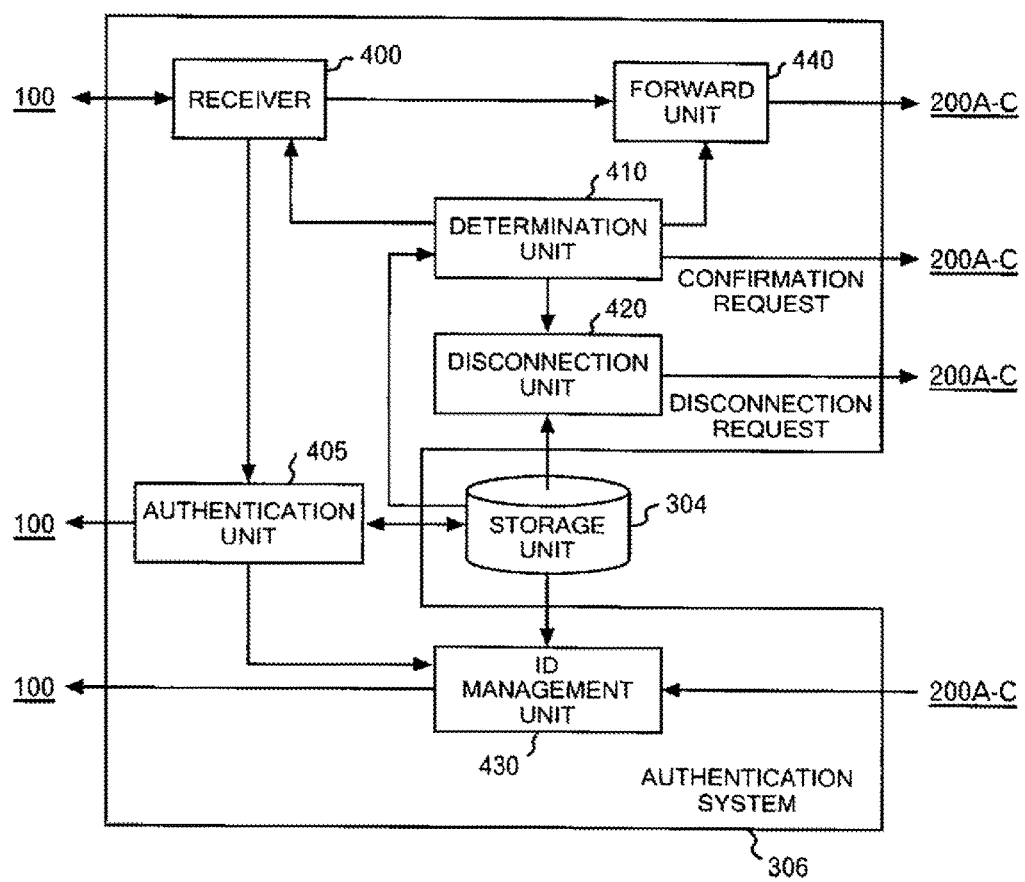
FIG. 4 shows a functional configuration of authentication system 306 according to the present embodiment.

FIG. 4 shows a functional configuration of the authentication system 306 according to the present embodiment. The authentication system 306 includes a receiver 400, an authentication unit 405, a determination unit 410, a disconnection unit 420, an ID management unit 430 and a forward unit 440. The receiver 400 receives a request to each of the server apparatuses 200A to 200C from the client apparatus 100 as a proxy for the server apparatuses 200A to 200C.

The authentication unit 405 authenticates a user on the basis of the login ID, the password and the like on condition that the authentication unit 405 receives a request that the user logs in to the reverse proxy server system 300. For the authentication, authentication data previously stored in the storage unit 304 may be used. The authentication unit 405 returns to the client apparatus 100 with the session ID between the client apparatus 100 and the reverse proxy server system 300 on condition that the authentication is successful. This session ID is set as a cookie on the web browser 106, for example, and then is addressed to and transmitted to the reverse proxy server system 300 along with a request to be transmitted by the client apparatus 100 thereafter.

Moreover, the authentication unit 405 may establish, on condition that the authentication is successful, the session between the client apparatus 100 and each of the servers 200A to 200C by acting as a proxy for the client apparatus 100. The IDs of the sessions established in the manner described above are caused by the ID management unit 430 to be stored in the storage unit 304. Thereafter, in response to receipt of a request to any one of the server apparatuses 200A to 200C from the client apparatus 100, the determination unit 410 determines whether the session established between the client apparatus 100 and each of the server apparatuses 200A to 200C is maintained. Although the implementation method of such determination is to be described later in detail, an overview of the implementation method is as follows.

The determination unit 410 reads information such as session IDs by scanning the storage unit 304 and then identifies a server apparatus 200 having a session established with the client apparatus 100. Here, suppose that session has been established between the client apparatus 100 and each of the server apparatuses 200A to 200C, for example. Then, the determination unit 410 transmits a confirmation request to each of the server apparatuses 200A to 200C. This confirmation request is a request to confirm that the session between the server apparatus 200 and the client apparatus 100 is maintained. This confirmation request may be previously stored in the storage unit 304, for example.

Then, the determination unit 410 determines, on the basis of a response to the request, whether the session is disconnected. Specifically, the determination unit 410 determines whether the response matches a predetermined expected response. This expected response is a predetermined response indicating that the session between the server apparatus 200 and the client apparatus 100 is maintained. This expected response may be previously stored in the storage unit 304, for example.

Then, the determination unit 410 determines, on condition that the response matches the expected response, that the session between the server apparatus 200 and the client device 100 is maintained. In the manner described above, for each of the server apparatuses 200A to 200C, the determination unit 410 determines whether the session between the server apparatus 200 and the client apparatus 100 is maintained.

On condition that the session between the client apparatus 100 and at least one server apparatus 200 among the server apparatuses 200A to 200C is already disconnected, the disconnection unit 420 disconnects the session established between the client apparatus 100 and each of the server apparatuses 200 different from aforementioned at least one server apparatus 200 among the server apparatuses 200A to 200C. Specifically, the disconnection unit 420 reads, from the storage unit 304, a disconnection request previously stored in the storage unit 304 in association with the server apparatus 200 to be disconnected, and then transmits the request.

In this case, the receiver 400 returns to the client apparatus 100 with an error message indicating that the sessions have been already disconnected. In the meantime, the forward unit 440 forwards, on condition that the sessions between the client apparatus 100 and all the server apparatuses 200A to 200C are maintained, the request received by the receiver 400 to the server apparatus 200 of the destination of the request.

Accordingly, by use of the functions described above, until any of the sessions is disconnected, each of the sessions can be appropriately maintained. In the meantime, in a case where any of the sessions is disconnected, the statuses of all the sessions can be synchronized (maintained or disconnected) by forcibly disconnecting the other sessions.

The ID management unit 430 may allow a session to be additionally established. Specifically, the ID management unit 430 monitors a response to be returned by any of the server apparatuses 200A to 200C in accordance with a request, which is transmitted by the client apparatus 100 and then forwarded by the forward unit 440. Then, in a case where the response received from any of the server apparatuses 200A to 200C indicates that a new session is to be established, the ID management unit 430 causes a session ID for identifying the new session to be stored in the storage unit 304.

As an example, when a new session is established between the client apparatus 100 and the server apparatus 200C in a case where sessions are already established between the client apparatus 100 and the server apparatuses 200A to 200B, a session ID of the new session is returned to the client apparatus 100 from the server apparatus 200C. The ID management unit 430 reads the session ID from the response and then causes the session ID to be stored in the storage unit 304 in association with the ID of the session already established between the client apparatus 100 and the reverse proxy server system 300. Accordingly, a new session can be added even after the combinations of the sessions to be in synchronization are already determined.

Next, a specific implementation example of the session management will be described with reference to FIGS. 5 to 7.

Figure 5:
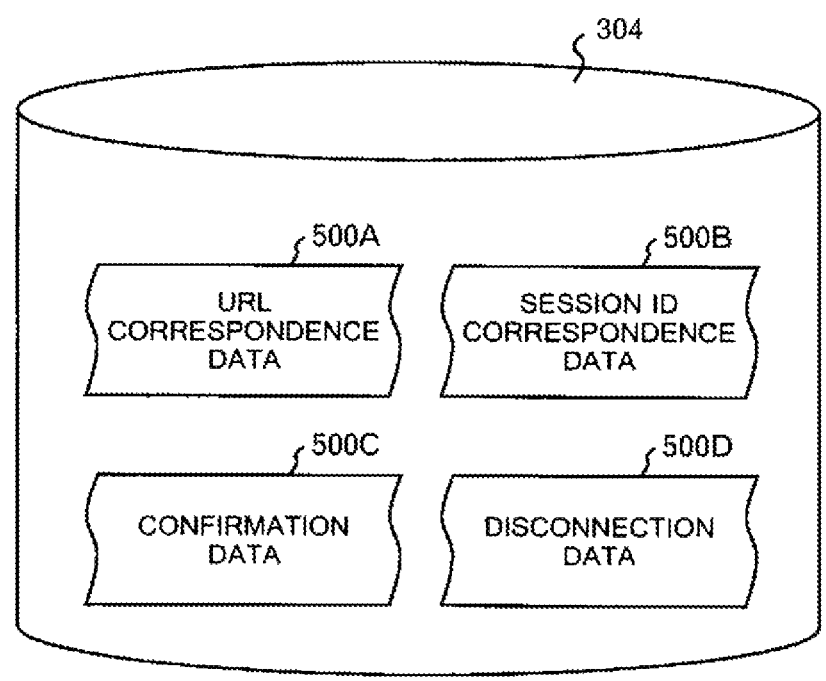
FIG. 5 shows an example of the data configuration of a storage unit 304.

FIG. 5 shows an example of a data configuration of the storage unit 304 according to the present embodiment. The storage unit 304 is an example of the first to the third storage units according to the present embodiment. Then, the storage unit 304 stores URL correspondence data 500A, session ID correspondence data 500B, confirmation data 500C and disconnection data 500D therein.

FIG. 6 shows examples of the URL correspondence data 500A and the session ID correspondence data 500B to be stored in the storage unit 304 according to the present embodiment. The URL correspondence data 500A includes client URLs respectively associated with sever URLs recorded therein. The URL correspondence data 500A is previously created by the developer of the communication network 10 and then recorded in the storage unit 304. The forward unit 440 forwards a request to an appropriate server apparatus 200 with reference to the URL correspondence data 500A.

Specifically, the forward unit 440 reads, from the request message, the destination URL of the request received by the receiver 400. Then, the forward unit 440 searches the URL correspondence data 500A for a client-side URL that matches the read destination URL. The forward unit 440 reads, from the URL correspondence data 500A, a server-side URL corresponding to the client-side URL that has been searched out. Then, the forward unit 440 forwards the request received by the receiver 400 with the read server-side URL as the destination.

As a result, a request, for example, with the destination, "http://www.??.com/jct1/index.html", is forwarded to the server apparatus 200A. Moreover, a request with the destination, "http://www.??.com/jct2/index.html", is forwarded to the server apparatus 200B. In addition, a request with the destination, "http://www.??.com/jct3/index.html", is forwarded to the server apparatus 200C.

As described above, by use of the URL correspondence data 500A, it is possible to cause the plurality of server apparatuses 200 to function as if they are a single web site.

Moreover, the session ID correspondence data 500B includes client-side session IDs, server-side session IDs and the server-side URLs recorded therein in association with one another. Each of the client-side session IDs identifies the session already established between the client apparatus 100 and the reverse proxy server system 300. Each of the server-side session IDs identifies a session established between the client apparatus 100 and at least one of the server apparatuses 200.

An example of processing that utilizes these pieces of data is as follows. First, when a request is received by the receiver 400, the forward unit 440 reads the session ID being set in the request. At the same time, as has been already described, the forward unit 440 specifies, on the basis of the URL correspondence data 500A, the server-side URL corresponding to the destination URL of the request received by the receiver 400.

The forward unit 440 sets the read session ID as the client-side ID, and searches for an entry corresponding to the specified server-side URL from the session ID correspondence data 500B. Then, the forward unit 440 reads the server-side ID included in the entry from the session ID correspondence data 500B. The forward unit 440 sets, in place of the session ID that has been already set, the read server-side ID in the request received by the receiver 400. Then, the forward unit 440 forwards the request, in which this server ID has been set, to the destination server apparatus 200.

In a case where the client-side URL of the destination that has been already set in the received request is "http://www.??.com/jct1/index.html" and where 35352 is set as the session ID in the request, the corresponding server-side ID 51552 is read by the forward unit 440 since the destination is the server apparatus 200A. Then, the forward unit 440 sets this read server ID 51552 in the received request and forwards the request to the server apparatus 200A.

As has been described, according to this session ID correspondence data 500B, it is possible to cause the client apparatus 100 to recognize the session established between the client apparatus 100 and each of the server apparatuses 200A to 200C as if the session was a single session.

Moreover, an example of the processing for registering a new session ID with this session ID correspondence data 500B is as follows. The ID management unit 430 determines, by monitoring a response addressed to the client device 100 and returned from any of the server apparatuses 200, whether a new session is established between the client apparatus 100 and an another server apparatus 200.

The ID management unit 430, for example, monitors a response for registering a session ID as a cookie with the web browser 106. Then, on condition that such a response is detected, the ID management unit 430 determines that a new session is established between the client apparatus 100 and a server apparatus not having a session established with the client apparatus 100 yet.

When a new session is established, the ID management unit 430 reads, from the response, a session ID to be registered. Then, the ID management unit 430 registers the read session ID with the session ID correspondence data 500B in association with the URL of the new different server apparatus 200.

For example, in a case where a new session is established between the client apparatus 100 and the server apparatus 200C under the situation where the sessions are already established between the client apparatus 100 and the server apparatuses 200A to 200B, an instruction to register the session ID as a cookie on the web browser 106 is included in the response addressed to the client apparatus 100 from the server apparatus 200C. The ID management unit 430 can register the session ID with the session ID correspondence data 500B by monitoring such response and reading the session ID.

In addition to the aforementioned processing, the URL correspondence data 500A and the session ID correspondence data 500B are used for conversion of the URL and the session ID set in a response which each of the servers 200 returns to the client apparatus 100. For example, upon receipt of a response from a certain server apparatus 200, the reverse proxy server system 300 searches for the URL included in the response from the server-side URL fields of the URL correspondence data 500A. Then, the reveres proxy server system 300 changes the URL included in the response to the client-side URL corresponding to the searched out server-side URL.

Likewise, upon receipt of a response from a certain server apparatus 200, the reverse proxy server system 300 searches for the session ID included in the response from the server-side session ID fields of the URL correspondence data 500B.

Then, the reveres proxy server system 300 changes the session ID included in the response to the client-side session ID corresponding to the searched out server-side session ID.

In the manner described above, the responses from the server apparatuses 200 to the client apparatus 100 can be recognized as if a single web site returned.

FIG. 7 shows examples of the confirmation data 500C and the disconnection data 500D, which are stored in the storage unit 304 according to the present embodiment. These pieces of data are previously created, by an engineer familiar with the operations of the server apparatuses 200A to 200C, and then stored in the storage unit 304. The confirmation data 500C records server-side URLs, confirmation requests and expected responses in association with one another. The processing performed in reference to the data is as follows, for example.

When the receiver 400 receives a request, the determination unit 410 scans the session ID correspondence data 500B, first, and then selects at least one server apparatus 200 whose session ID corresponding to the request has been already recorded in the session ID correspondence data 500B. For example, in a case where a session ID, 35352, is set in the request, the determination unit 410 reads all the server-side URLs each having the session ID as the client-side ID. Then, the determination unit 410 selects at least one of the server apparatuses 200 specified by the respective server-side URLs. In the example of FIG. 6, all of the server apparatuses 200A to 200C are selected.

The selected server apparatus 200 is a server apparatus 200 having a session already established with the client apparatus 100. However, whether or not the session established between the server apparatus 200 and the client apparatus 100 is still maintained is unknown. Accordingly, the determination unit 410 transmits a confirmation request to determine whether the session between the selected at least one of the server apparatuses 200 and the client apparatus 100 is already disconnected.

Specifically, for each of the selected server apparatuses, the determination unit 410 reads a confirmation request corresponding to the server apparatus 200 from the confirmation data 500C. Then, the determination unit 410 transmits the read confirmation request to the corresponding server apparatus 200. For example, a confirmation request starting from "POST/," a confirmation request starting from "GET/" and a confirmation request starting from "POST/" are transmitted to the server apparatuses 200A, 200B and 200C, respectively.

Next, the determination unit 410 reads, from the confirmation data 500C, an expected response corresponding to the server apparatus 200, which is the destination of the confirmation request. Then, the determination unit 410 compares the response of the server apparatus 200 corresponding to the confirmation request with the expected response. The determination unit 410 determines, on condition that these responses are different, the session between the server apparatus 200 and the client apparatus 100 is disconnected.

For each of the plurality of server apparatuses 200, a server-side URL for identifying the server apparatus 200 and a disconnection request to be transmitted for disconnecting the session between the server apparatus 200 and the client apparatus 100 are recorded in the disconnection data 500D in association with each other. The processing performed in reference to the data is as follows, for example.

In a case where the sessions between the client apparatus 100 and all the server apparatuses 200 are to be disconnected, the determination unit 410 reads the disconnection requests corresponding to the respective server apparatuses 200 from the disconnection data 500D, first. Next, the determination unit 410 transmits the read disconnection requests to the corresponding server apparatuses 200, respectively.

Each of the disconnection requests is to request force logout or force time-out detection, for example. According to the request, each of the server apparatuses 200A to 200C disconnects the session, and thereby, the memory areas or the like secured for maintaining the respective sessions can be released.

Figure 8:
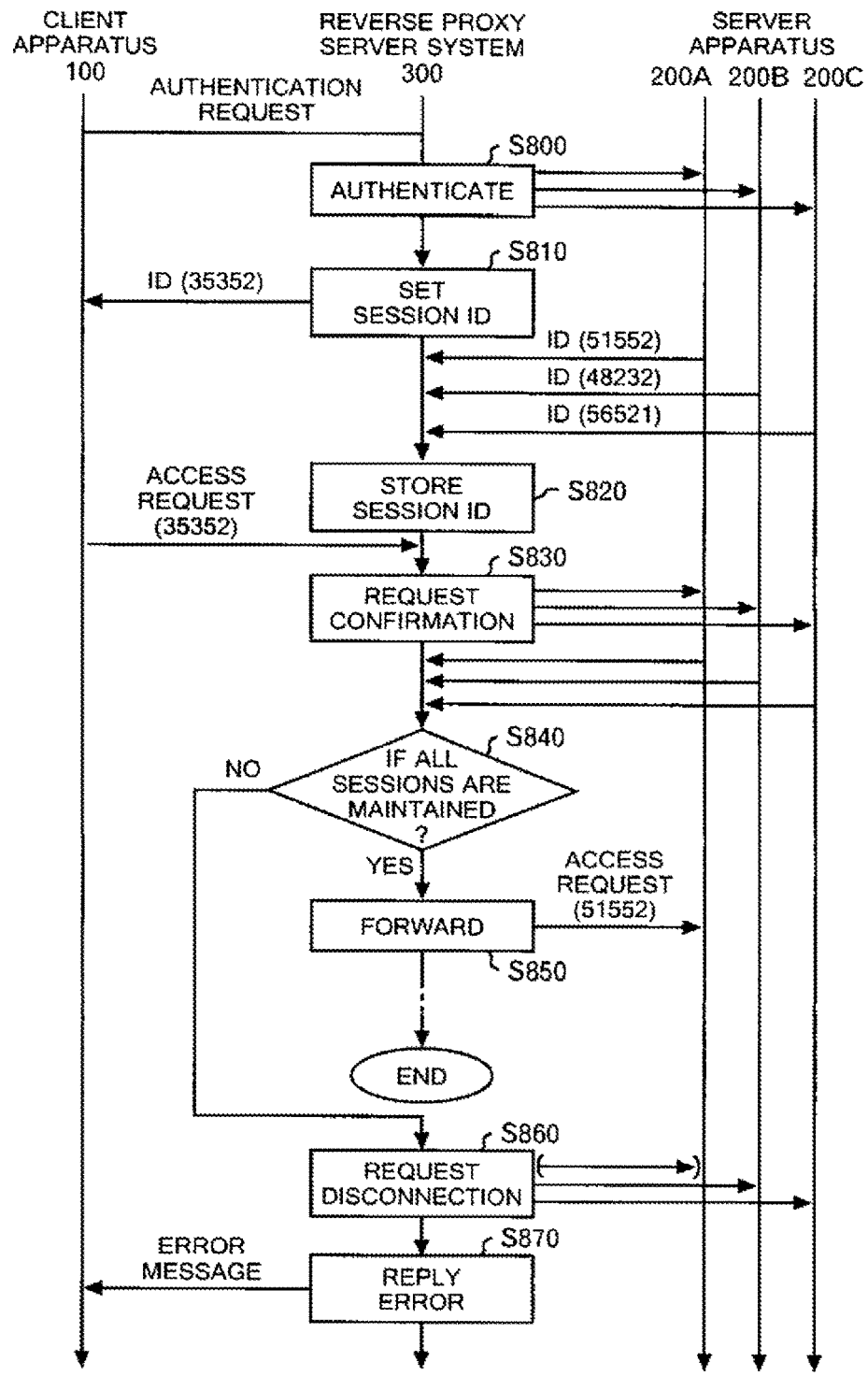
FIG. 8 shows an example of a processing flow of a reverse proxy server system 300 according to the present embodiment.

FIG. 8 shows an example of a processing flow of the reverse proxy server system 300 according to the present embodiment. When the receiver 400 receives a message requesting user authentication from the client apparatus 100, the authentication unit 405 authenticates the user on the basis of the login ID, the password and the like (S800).

The authentication unit 405 acts a proxy for the client apparatus 100 and transmits, on condition that the authentication is successful, a request to establish a session between the client apparatus 100 and each of the server apparatuses 200A to 200C to each of the server apparatuses 200A to 200C. Along with this operation, the authentication unit 405 returns to the client apparatus 100 with a session ID (35352, for example) for identifying the session between the client apparatus 100 and the reverse proxy server system 300 (S810). The web browser 106 of the client apparatus 100 sets this session ID as a cookie or the like so that this session ID can be set in a request to be transmitted thereafter.

The ID management unit 430 receives, from the server apparatuses 200A to 200C, session IDs each being for identifying a new session between the client apparatus 100 and each of the server apparatuses 200A to 200C respectively. For example, the ID of the session established between the client apparatus 100 and the server apparatus 200A is 51552, and the ID of the session established between the client apparatus 100 and the server apparatus 200B is 48232. Moreover, the ID of the session established between the client apparatus 100 and the server apparatus 200C is 56521.

Then, the ID management unit 430 causes the received session IDs to be stored in the storage unit 304 in association with the session ID (35352, for example) of the session already established between the client apparatus 100 and the reverse proxy server system 300 (S820). The data structure of the session IDs to be stored is the same as that described above as the session ID correspondence data 500B, for example.

When the receiver 400 receives a request to any of the server apparatuses 200 from the client apparatus 100 after the aforementioned operation, the determination unit 410 determines whether the session established between the client apparatus 100 and each of the server apparatuses 200 is maintained (S830). In order to specify the session established already between the client apparatus 100 and each of the server apparatuses 200, the determination unit 410 can refer to the session ID correspondence data 500B as described above. In addition, in order to determine whether each of the sessions is maintained, the determination unit 410 can transmit a confirmation request by use of the confirmation data 500C as described above.

This confirmation request satisfies the role of preventing time-out detection on the session being maintained as well as the role of confirming that the session is maintained. For example, each of the server apparatuses 200A to 200C resets the time counter for the time-out detection upon receipt of the confirmation request. Accordingly, the time counters of the respective sessions are synchronized, thereby making the matching of the session statuses easier. It should be noted that in a case where the time counter is not reset by a confirmation request, the determination unit 410 may transmit a request to reset the time counter by adding the request in the confirmation request.

The forward unit 440 forwards, on condition that all the sessions established already between the client apparatus 100 and the server apparatuses are maintained (S840: Yes), the request received by the receiver 400 to the destination server apparatus 200 for the request (S850). This processing will be specifically described as follows. The forward unit 440 first determines as described above, on the basis of the destination URL of the request, the server apparatus 200 of the forwarding destination to which the request is to be forwarded. This determination is made by matching the destination URL with the URL correspondence data 500A. Here, the server apparatus 200A is determined to be the destination.

Moreover, the forward unit 440 reads the session ID corresponding to the determined server apparatus 200 from the session ID correspondence data 500B of the authentication system 306. Then, the forward unit 440 sets the read session ID in the request. Here, 51552, which is the session ID corresponding to the server apparatus 200A, is set. Then, the forward unit 440 forwards the request including the session ID set therein to the server apparatus 200A that is the destination.

The aforementioned processing from S830 to S850 is repeated every time the receiver 400 receives a request.

In the meantime, the disconnection unit 420 disconnects, on condition that a session between the client apparatus 100 and at least one of the server apparatuses 200 is already disconnected (S840: No), session established between the client apparatus 100 and each of the server apparatuses 200 (for example, the server apparatuses 200B and 200C) except for the server apparatus 200 having the session already disconnected (for example, the server apparatus 200A) among the server apparatuses 200A to 200C (S860).

The disconnection unit 420, for example, may read disconnection requests respectively corresponding to the server apparatuses 200B and 200C from the disconnection data 500D, and then transmits the read disconnection requests to the respective server apparatuses 200B and 200C. Instead of this operation, the disconnection unit 420 may transmit disconnection requests to all the server apparatuses 200 each having a session established with the client apparatus 100 (all the server apparatuses 200A to 200C in this case, for example) regardless of whether the server apparatus 200 have the session already disconnected. Then, the receiver 400 returns to the client apparatus 100 with an error message indicating that the session has been already disconnected (S870).

As has been described above with reference to FIGS. 1 to 8, in the case of the communication network 10 according to the present embodiment, even in a case where each of the server apparatuses 200A to 200C, itself, is provided with a logout or time-out detection function, the statuses of the session established between the client apparatus 100 and each of the server apparatuses 200A to 200C can be synchronized. Thereby, even in a case where existing server apparatuses 200 each operating independently are used, there is no need to handle an error caused due to the situation where the statuses of the sessions are not synchronized. Accordingly, the amount of work and costs associated with the designing, development and maintenance of the entire system can be reduced.

Subsequently, as a variation of the present embodiment, a description will be given of another embodiment that allows the synchronization of the statuses of sessions.

Figure 9:
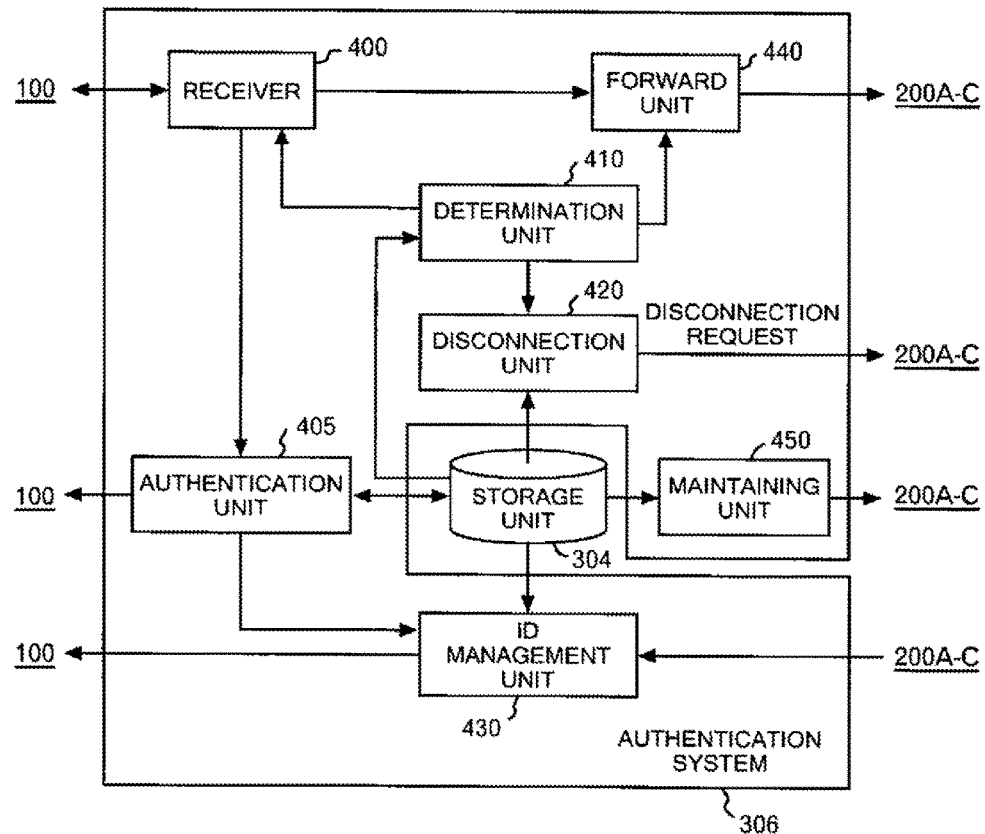
FIG. 9 shows a functional configuration of an authentication system 306 according to a variation of the present embodiment.

FIG. 9 shows a functional configuration of an authentication system 306 according to the variation of the present embodiment. In this variation as well, the authentication system 306 includes a receiver 400, an authentication unit 405, a determination unit 410, a disconnection unit 420, an ID management unit 430 and a forward unit 440 as in the case of the aforementioned embodiment. In this variation, the authentication system 306 further includes a maintaining unit 450, in addition to the aforementioned components.

The receiver 400, the authentication unit 405 and the ID management unit 430 in this variation are substantially the same as the receiver 400, the authentication unit 405 and the ID management unit 430 in the aforementioned embodiment. Specifically, as a proxy for each of the server apparatuses 200A to 200C, the receiver 400 receives a request to each of the server apparatuses 200A to 200C from the client apparatus 100.

In addition, the authentication unit 405 authenticates, on condition that a request that the user logs in to the reverse proxy server system 300 is received, the user on the basis of the login ID, the password and the like. Then, on condition that the authentication is successful, the authentication unit 405 returns to the client apparatus 100 with the session ID between the client apparatus 100 and the reverse proxy server system 300. Moreover, on condition that the authentication is successful, the authentication unit 405 may cause the ID management unit 430 to act as a proxy for the client apparatus 100 and to establish the session between the client apparatus 100 and each of the server apparatuses 200A to 200C by instructing the ID management unit 430.

The ID management unit 430 may also allow a new session to be additionally established. Specifically, in accordance with the request transmitted from the client apparatus 100 and then forwarded by the forward unit 440, the ID management unit 430 monitors a response to be returned by any of the server apparatuses 200A to 200C. Then, in a case where the response, received from any of the server apparatuses 200A to 200C, indicates that a new session is to be established, the ID management unit 430 causes the session ID for identifying the new session to be stored in the storage unit 304.

On the other hand, the determination unit 410, the disconnection unit 420 and the forward unit 440, and the data structure of the storage unit 304 are different from those in the aforementioned embodiment. First, the maintaining unit 450 transmits, for maintaining the session, a request to each of the plurality of server apparatuses 200, each of which has a session already established with the client apparatus 100, in a shorter time period than the time-out period determined corresponding to the server apparatus 200. Each of the sessions already established is specified on the basis of the session ID correspondence data 500B as described with reference to FIG. 6, for example. In addition, it is preferable that the logout functions included originally in each server apparatuses 200A to 200C should be disabled in advance.

Then, the determination unit 410 determines, on the basis of the request being received from the client apparatus 100 and being addressed to any of the server apparatuses 200, whether or not to disconnect all the sessions established already between the client apparatus 100 and the plurality of server apparatuses 200. For example, the determination unit 410 may detect time out of a session. Specifically, the determination unit 410 determines whether request is transmitted from the client apparatus 100 to any of the server apparatuses 200, each of which has a session established with the client apparatus 100, within the predetermined time-out period. Then, on condition that no request is transmitted within the time-out period, the determination unit 410 determines to disconnect all the sessions already established.

As another example, the determination unit 410 may detect an explicit instruction such as logout. Specifically, the determination unit 410 determines whether an instruction to disconnect all the sessions already established is received from the client apparatus 100. On condition that such an instruction is received, the determination unit 410 determines to disconnect all the sessions established already between the client apparatus 100 and the plurality of server apparatuses. This explicit instruction may be, for example, a request that the user logs out from the reverse proxy server system 300 to which the user has been logged in.

Then, the disconnection unit 420 disconnects, on condition that the determination unit 410 determines to disconnect all the sessions, the sessions between the client apparatus 100 and the plurality of server apparatuses 200. The sessions are disconnected by the transmission of the disconnection requests read from the disconnection data 500D as described with reference to FIG. 6, for example. Furthermore, the disconnection unit 420 disconnects the session between the client apparatus 100 and the reverse proxy server system 300.

Moreover, the forward unit 440 simply forwards, on condition that the receiver 400 has received a request addressed to any of the server apparatuses 200, the request to the destination server apparatus 200. Specifically, unlike the aforementioned embodiment, the request is simply forwarded without confirming whether the session is maintained. As described with reference to FIG. 6, the destination is specified on the basis of the URL correspondence data 500A. In addition, the forward unit 440 sets a server-side session ID in the request to be forwarded. The server-side session ID is specified on the basis of the session ID correspondence data 500B as described with reference to FIG. 6.

FIG. 10 shows an example of the URL correspondence data 500A according to the variation of the present embodiment. In the URL correspondence data 500A, client-side URLs and server-side URLs, and time-out periods set for the respective server apparatuses 200 each being identified by each of the server-side URLs are recorded in association with one another.

Each of the time-out periods is previously determined on the basis of the specification or the like of a program installed on each of the server apparatuses 200. Specifically, each of the server apparatuses 200 disconnects the session on condition that the period during which no request is received exceeds the time-out period set for each of the server apparatuses 200. Then, the previously determined time-out periods are recorded in advance by the administrator or the like by accompanying with the URL correspondence data 500A.

An example of the processing performed with reference to the URL correspondence data 500A is as follows. First, the maintaining unit 450, for example, periodically, selects, on the basis of the session ID correspondence data 500B, for example, server apparatuses 200 each having a session established with the client apparatus 100. Then, the maintaining unit 450 reads, from the URL correspondence data 500A, time-out periods respectively corresponding to the selected server apparatuses 200.

Then, for each of the server apparatuses 200, the maintaining unit 450 determines whether the time period passed after the request is transmitted last time becomes near the time-out period corresponding to the server apparatus 200. For example, the maintaining unit 450 determines whether the time period after the request is transmitted last time has become one minute before the time-out period corresponding to the server apparatus 200. The maintaining unit 450 transmits, on condition that the determination made is true, a request to reset the time counter of the time-out detection.

As described above, by use of the URL correspondence data 500A according to this variation, the maintaining unit 450 can maintain a session by transmitting a request at a shorter interval than the time-out period.

Figure 11:
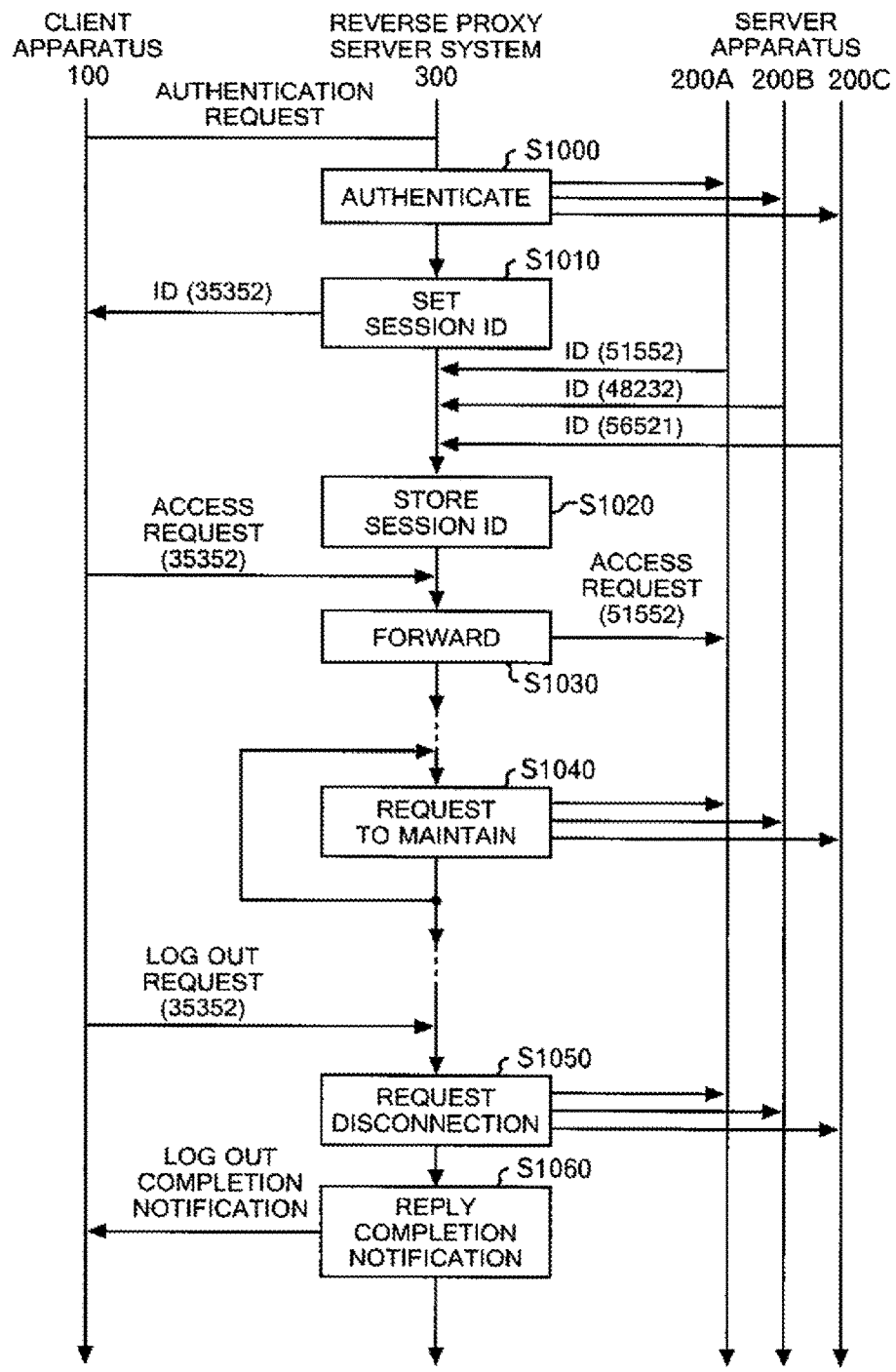
FIG. 11 shows an example of a processing flow of a reverse proxy server system 300 according to the variation of the present embodiment.

FIG. 11 shows an example of the processing flow of the reverse proxy server system 300 according to the variation of the present embodiment. The processing (S1000 to S1020) according to this variation is substantially the same as the processing described with reference to FIG. 8 (S800 to S820). Specifically, the processing is described as follows. When the receiver 400 receives a message requesting user authentication from the client apparatus 100, the authentication unit 405 authenticates the user on the basis of the login ID, the password and the like (S1000).

The authentication unit 405 acts a proxy for the client apparatus 100 and transmits to each of the server apparatuses 200A to 200C, on condition that the authentication is successful, a request to establish a session between the client apparatus 100 and each of the server apparatuses 200A to 200C. Along with this operation, the authentication unit 405 returns to the client apparatus 100 with a session ID (35352, for example) for identifying the session between the client apparatus 100 and the reverse proxy server system 300 (S1010). The web browser 106 of the client apparatus 100 sets this session ID as a cookie or the like so that this session ID can be set in a request to be transmitted thereafter.

The ID management unit 430 receives, from each of the server apparatuses 200A to 200C, session IDs each being for identifying a new session between the client apparatus 100 and each of the server apparatuses 200A to 200C respectively. For example, the ID of the session established between the client apparatus 100 and the server apparatus 200A is 51552, and the ID of the session established between the client apparatus 100 and the server apparatus 200B is 48232. Moreover, the ID of the session established between the client apparatus 100 and the server apparatus 200C is 56521.

Then, the ID management unit 430 causes the received session IDs to be stored in the storage unit 304 in association with the session ID (35352, for example) of the session already established between the client apparatus 100 and the reverse proxy server system 300 (S1020). The data structure of the session IDs to be stored is the same as that described above as the session ID correspondence data 500B, for example.

The processing to be performed after S1030 is different from the processing described with reference to FIG. 8. On condition that the receiver 400 has received a request addressed to any of the server apparatuses 200 (for example, the server apparatus 200A), the forward unit 440 forwards the request to the destination server apparatus 200. The server-side session ID is set in the request to be forwarded. In this example, the ID, 35352, for identifying the session between the server apparatus 200A and the client apparatus 100 is set.

Independently from this forward processing, the maintaining unit 450 transmits a request to maintain the session already established between the client apparatus 100 and each of the plurality of server apparatuses 200 to each of the server apparatuses 200A to 200C at a predetermined time interval (S1040).

Then, the determination unit 410, for example, determines to disconnect all the sessions already established between the client apparatus 100 and the plurality of server apparatuses in a case where the determination unit 410 receives, from the client apparatus 100, an instruction to disconnect all the sessions already established. In accordance with the determination, the disconnection unit 420 disconnects the sessions established between the client apparatus 100 and the plurality of server apparatuses 200 (S1050). Then, on condition that the sessions are disconnected, the receiver 400 returns to the client apparatus 100 with a notification that the processing for disconnecting the sessions is appropriately completed.

As has been described with reference to FIGS. 9 to 11, in the case of this variation as well, the reverse proxy server system 300 appropriately maintains the sessions already established unless time-out detection or an explicit instruction is present. Then, the reverse proxy server system 300 disconnects all the sessions at once in accordance with the presence of the time-out detection or the like. Thereby, the statuses of the sessions already established can be synchronized. According to this variation, unlike the aforementioned embodiment, the amount of communication traffics can be reduced since there is no need for transmitting a confirmation request for each access.

Figure 12:
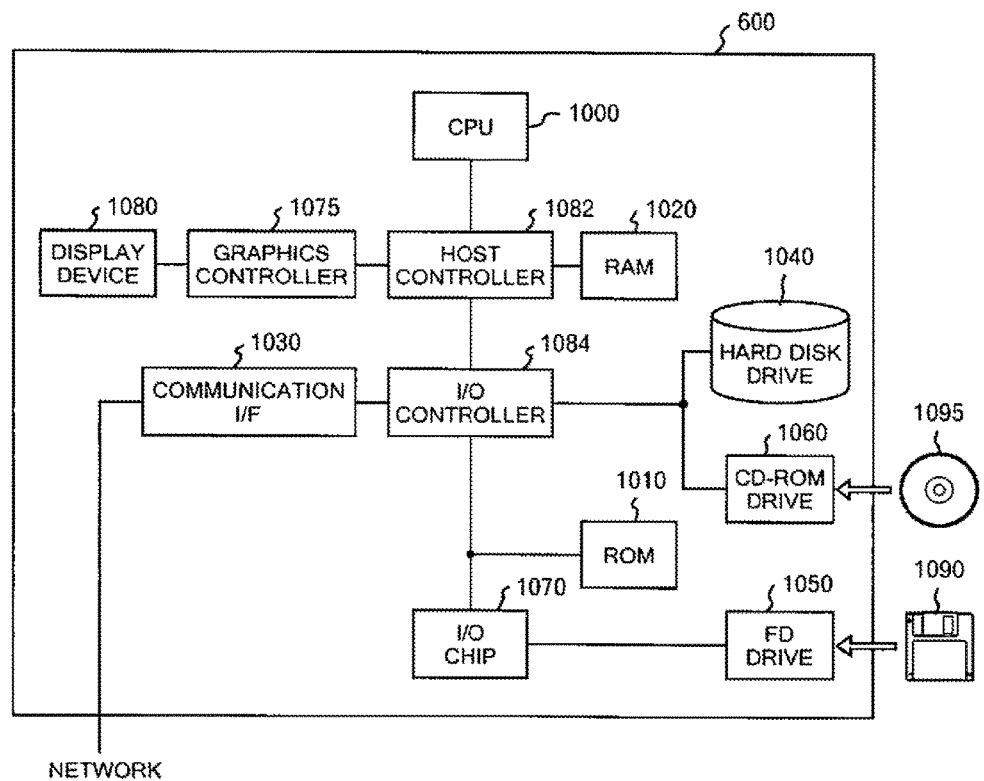
FIG. 12 shows an example of a hardware configuration of a computer 600 functioning as the reverse proxy server system 300 according to the present embodiment or the variation of the present embodiment.

FIG. 12 shows an example of a hardware configuration of a computer 600 functioning as the reverse proxy server system 300 according to the present embodiment or the variation of the embodiment. The computer 600 includes a CPU peripheral unit, an input/output unit and a legacy input/output unit. The CPU peripheral unit includes a CPU 1000, a RAM 1020 and a graphics controller 1075, all of which are mutually connected to one another via a host controller 1082. The input/output unit includes a communication interface 1030, a hard disk drive 1040 and a CD-ROM drive 1060, all of which are connected to the host controller 1082 via an input/output controller 1084. The legacy input/output unit includes a ROM 1010, which is connected to the input/output controller 1084, a flexible disk drive 1050 and an input/output chip 1070.

The host controller 1082 mutually connects the RAM 1020 to the CPU 1000 and the graphics controller 1075, both of which access the RAM 1020 at a high transfer rate. The CPU 1000 operates according to a program stored in the ROM 1010 and the RAM 1020, and controls each of the components. The graphics controller 1075 obtains image data generated by the CPU 1000 or the like in a frame buffer provided in the RAM 1020, and causes the obtained image data to be displayed on a display device 1080. In place of this, the graphics controller 1075 may internally include a frame buffer in which the image data generated by the CPU 1000 or the like is stored.

The input/output controller 1084 connects the host controller 1082 to the communication interface 1030, the hard disk drive 1040 and the CD-ROM drive 1060, all of which are relatively high-speed input/output devices. The communication interface 1030 functions as the aforementioned communication interface 302, for example, and communicates with an external device via a network. The hard disk drive 1040 functions as the aforementioned storage unit 304, for example, and stores programs and data to be used by the computer 600. The CD-ROM drive 1060 reads a program or data from a CD-ROM 1095, and provides the read-out program or data to the RAM 1020 or the hard disk 1040.

Moreover, the input/output controller 1084 is connected to relatively low-speed input/output devices such as the ROM 1010, the flexible disk drive 1050 and an input/output chip 1070. The ROM 1010 stores programs such as a boot program to be executed by the CPU 1000 at a start-up time of the computer 600 and a program depending on hardware of the computer 600. The flexible disk drive 1050 reads a program or data from a flexible disk 1090, and provides the read-out program or data to the RAM 1020 or the hard disk drive 1040 via the input/output chip 1070. The input/output chip 1070 connects various kinds of input/output devices, for example, through a parallel port, a serial port, a keyboard port, a mouse port and the like.

A program to be provided to the computer 600 is provided by a user with the program stored in a storage medium such as the flexible disk 1090, the CD-ROM 1095 and an IC card. The program is read from the storage medium via the input/output chip 1070 and/or the input/output controller 1084, and is installed and executed on the computer 600. Since an operation that the program causes the computer 600 or the like to execute is identical to the operation of the reverse proxy server system 300 in the embodiment described by referring to FIGS. 1 to 11, the description thereof is omitted, here.

The program described above may be stored in an external storage medium. As the storage medium, any one of the following media may be used: an optical recording medium such as a DVD or a PD; a magneto-optical recording medium such as an MD; a tape medium; and a semiconductor memory such as an IC card, in addition to the flexible disk 1090 and the CD-ROM 1095. Alternatively, the program may be provided to the computer 600 via a network, by using, as a recording medium, a storage unit such as a hard disk or a RAM provided in a server system connected to a private communication network or the Internet.

Hereinabove, the present invention has been described by using the embodiment. The technical scope of the present invention, however, is not limited to the scope described in the above-described embodiment. It is obvious to one skilled in the art that various modifications and improvements may be made to the embodiment. Moreover, it is also obvious from the description in the scope of the present invention that such modified and improved embodiments are included in the technical scope of the present invention.

What is claimed is:

1. A method for managing client-server communications, the method comprising computer-executed actions of:
  authenticating a common client apparatus in a reverse proxy server system acting as a proxy for each of a plurality of server apparatuses responsive to a request from said common client apparatus, said authenticating causing authentication data from said common client apparatus to be stored in said reverse proxy server system;
  establishing, using said reverse proxy server system, a plurality of concurrent sessions for communicating between said common client apparatus and said plurality of server apparatuses responsive to at least one request from said common client apparatus by logging into each said server apparatus using said authentication data, each session of said plurality of concurrent sessions being established for communicating between said common client apparatus and a corresponding respective server apparatus of said plurality of server apparatuses, wherein said reverse proxy system stores correspondence data which associates information from the at least one request from the common client apparatus to each session of said plurality of concurrent sessions established so that requests from the common client to any of the plurality server apparatuses are routed to the reverse proxy server system using respective URLs each having a root portion common to all of the sessions and a respective extension portion corresponding to the respective session to which the request pertains, the reverse proxy system using the correspondence data to forward each request to a respective server apparatus of the plurality of server apparatuses using a respective URL of the respective server apparatus contained in the correspondence data, causing the plurality of server apparatuses to function as if the plurality of server apparatuses were a single web site;

receiving, in said reverse proxy server system acting as a proxy for each of the plurality of server apparatuses, a first disconnection request from the common client apparatus, said first disconnection request being directed to a single one of said plurality of server apparatuses, said first disconnection request being a request to disconnect a session of said plurality of concurrent sessions to which the single one of said plurality of server apparatuses corresponds;

responsive to receiving said first disconnection request from the common client apparatus, automatically forwarding a plurality of second disconnection requests, a respective second disconnection request being forwarded to each of said plurality of server apparatuses, each second disconnection request for disconnecting a corresponding session for communicating between said common client apparatus and the corresponding server apparatus of said plurality of server apparatuses, each said second disconnection request causing log out and termination of the corresponding session.

2. The method according to claim 1, wherein said reverse proxy server system maintains a respective session ID for each connection between the reverse proxy server system and a respective server apparatus of the plurality of server apparatuses, and a separate session ID for a connection between the reverse proxy server system and the common client apparatus.

3. The method according to claim 1, further comprising: periodically automatically transmitting, from said reverse proxy system to each server apparatus of said plurality of server apparatuses, a respective request to maintain a corresponding session for communicating between the common client apparatus and the corresponding server apparatus.

4. A non-transitory computer-readable media embodying a program executable by at least one processor unit of a computer for causing the computer to function as a system for managing communications between a common client apparatus and a plurality of server apparatuses, the common client apparatus and the plurality of server apparatuses being separate from said computer, the program causing the computer to:

authenticate said common client apparatus responsive to a request from said common client apparatus, said authenticating causing authentication data from said common client apparatus to be stored on said computer;

establish a plurality of concurrent sessions for communicating between said common client apparatus and said plurality of server apparatuses responsive to at least one request from said common client apparatus by logging into each said server apparatus using said authentication data, each session of said plurality of concurrent sessions being established for communicating between said common client apparatus and a corresponding respective server apparatus of said plurality of server apparatuses, wherein the program further causes the computer to store correspondence data which associates information from the at least one request from the common client apparatus to each session of said plurality of concurrent sessions established so that requests from the common client to any of the plurality server apparatuses are routed to the computer system using respective URLs each having a root portion common to all of the sessions and a respective extension portion corresponding to the respective session to which the request pertains, the computer using the correspondence data to forward each request to a respective server apparatus of the plurality of server apparatuses using a respective URL of the respective server apparatus contained in the correspondence data, causing the plurality of server apparatuses to function as if the plurality of server apparatuses were a single web site;

receiving a first disconnection request from the common client apparatus, said first disconnection request being directed to a single one of said plurality of server apparatuses, said first disconnection request being a request to disconnect a session of said plurality of concurrent sessions to which the single one of said plurality of server apparatuses corresponds;

responsive to receiving said first disconnection request from the common client apparatus, automatically forward a plurality of second disconnection requests, a respective second disconnection request being forwarded to each of said plurality of server apparatuses, each second disconnection request for disconnecting a corresponding session for communicating between said common client apparatus and the corresponding server apparatus of said plurality of server apparatuses, each said second disconnection request causing log out and termination of the corresponding session.

5. The non-transitory computer readable media according to claim 4, wherein said computer maintains a respective session ID for each connection between the computer and a respective server apparatus of the plurality of server apparatuses, and a separate session ID for a connection between the computer and the common client apparatus.

6. The non-transitory computer readable media according to claim 4, wherein the program further causes the computer to:

periodically automatically transmit, from said computer to each server apparatus of said plurality of server apparatuses, a respective request to maintain a corresponding session for communicating between the common client apparatus and the corresponding server apparatus.

* * * * *